(12) United States Patent
Becker et al.

(10) Patent No.: US 12,141,914 B2
(45) Date of Patent: Nov. 12, 2024

(54) TECHNIQUES FOR MANIPULATING COMPUTER GRAPHICAL LIGHT SOURCES

(71) Applicant: Apple Inc., Cupertino, CA (US)

(72) Inventors: Zachary Z. Becker, Kirkland, WA (US); Mahdi Nabiyouni, Emeryville, CA (US); Robin Yann Joram Storm, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 86 days.

(21) Appl. No.: 17/807,236

(22) Filed: Jun. 16, 2022

(65) Prior Publication Data
US 2022/0414975 A1    Dec. 29, 2022

Related U.S. Application Data

(60) Provisional application No. 63/216,399, filed on Jun. 29, 2021.

(51) Int. Cl.
*G06T 15/50*   (2011.01)
*G06F 3/04845*   (2022.01)
*G06F 3/04842*   (2022.01)

(52) U.S. Cl.
CPC .......... *G06T 15/50* (2013.01); *G06F 3/04845* (2013.01); *G06F 3/04842* (2013.01); *G06F 2203/04804* (2013.01); *G06T 2200/24* (2013.01)

(58) Field of Classification Search
CPC ..... G06T 15/50; G06T 19/00; G06T 2200/24; G06F 3/04845; G06F 3/04842; G06F 2203/04804
See application file for complete search history.

(56) References Cited

U.S. PATENT DOCUMENTS

| | | | |
|---|---|---|---|
| 5,809,267 | A | 9/1998 | Moran et al. |
| 6,295,069 | B1 | 9/2001 | Shirur |

(Continued)

FOREIGN PATENT DOCUMENTS

| | | |
|---|---|---|
| GB | 2540791 A | 2/2017 |
| WO | 2019/172678 A1 | 9/2019 |

(Continued)

OTHER PUBLICATIONS

Adding Environments, Available online at: https://manual.keyshot.com/manual/environments/adding-environments/, [retrieved on Jun. 9, 2023], 2 pages.

(Continued)

*Primary Examiner* — Xilin Guo
(74) *Attorney, Agent, or Firm* — Kubota & Basol LLP

(57) ABSTRACT

A computer-generated virtual light source manipulator having one or more affordances for manipulating a computer-generated virtual light sources is disclosed. Selection of a virtual light source can cause a light source manipulator tailored for that virtual light source to be displayed over the virtual light source. The light source manipulator can include various lines, circles and the like that can define starting boundaries (e.g., surfaces that represent the start location and initial aperture of light emission from the virtual light source), ending boundaries (e.g., surfaces that represent the extent or reach (i.e., end location or projection distance) and final aperture of light transmission from the virtual light source), and fade boundaries (e.g., surfaces that represent the beginning of the fading of the virtual light source). The light source manipulators can also include one or more disc or spherical affordances for adjusting these boundaries.

20 Claims, 6 Drawing Sheets

(56) References Cited

U.S. PATENT DOCUMENTS

| | | |
|---|---|---|
| 6,426,745 B1 | 7/2002 | Isaacs et al. |
| 6,750,873 B1 | 6/2004 | Bernardini et al. |
| 7,298,370 B1 | 11/2007 | Middler et al. |
| 9,294,757 B1 | 3/2016 | Lewis et al. |
| 9,396,580 B1* | 7/2016 | Nowrouzezahrai ... G06T 15/506 |
| 10,671,241 B1 | 6/2020 | Jia et al. |
| 11,204,678 B1 | 12/2021 | Baker et al. |
| 11,641,460 B1 | 5/2023 | Geusz et al. |
| 11,847,748 B2 | 12/2023 | Liu et al. |
| 2002/0030692 A1 | 3/2002 | Griesert |
| 2005/0062738 A1 | 3/2005 | Handley et al. |
| 2005/0248299 A1* | 11/2005 | Chemel .............. H05B 47/155 315/312 |
| 2010/0302245 A1* | 12/2010 | Best ................. G06T 15/50 345/426 |
| 2011/0142321 A1 | 6/2011 | Huffman |
| 2012/0113223 A1 | 5/2012 | Hilliges et al. |
| 2012/0170089 A1 | 7/2012 | Kim et al. |
| 2013/0222227 A1 | 8/2013 | Johansson et al. |
| 2013/0321462 A1 | 12/2013 | Salter et al. |
| 2013/0332890 A1 | 12/2013 | Ramic et al. |
| 2014/0040832 A1 | 2/2014 | Regelous |
| 2014/0078176 A1 | 3/2014 | Kim et al. |
| 2014/0104206 A1 | 4/2014 | Anderson |
| 2014/0129990 A1 | 5/2014 | Xin et al. |
| 2014/0333666 A1 | 11/2014 | Poulos et al. |
| 2014/0368620 A1 | 12/2014 | Li et al. |
| 2015/0067580 A1 | 3/2015 | Um et al. |
| 2015/0153833 A1 | 6/2015 | Pinault et al. |
| 2015/0317831 A1 | 11/2015 | Ebstyne et al. |
| 2015/0331576 A1 | 11/2015 | Piya et al. |
| 2016/0189426 A1 | 6/2016 | Thomas et al. |
| 2016/0225164 A1 | 8/2016 | Tomlin et al. |
| 2017/0032568 A1 | 2/2017 | Gharpure et al. |
| 2017/0052595 A1 | 2/2017 | Poulos et al. |
| 2017/0053383 A1 | 2/2017 | Heo |
| 2017/0178392 A1 | 6/2017 | Zuccarino et al. |
| 2017/0213388 A1 | 7/2017 | Margolis et al. |
| 2017/0221264 A1 | 8/2017 | Perry |
| 2017/0243352 A1 | 8/2017 | Kutliroff et al. |
| 2017/0251143 A1 | 8/2017 | Peruch et al. |
| 2017/0270715 A1 | 9/2017 | Lindsay et al. |
| 2017/0287215 A1 | 10/2017 | Lalonde et al. |
| 2017/0287225 A1 | 10/2017 | Powderly et al. |
| 2017/0351094 A1 | 12/2017 | Poulos et al. |
| 2018/0005433 A1 | 1/2018 | Kohler et al. |
| 2018/0088787 A1 | 3/2018 | Bereza et al. |
| 2018/0103209 A1 | 4/2018 | Fischler et al. |
| 2018/0122138 A1 | 5/2018 | Piya et al. |
| 2018/0130255 A1 | 5/2018 | Hazeghi et al. |
| 2018/0143693 A1 | 5/2018 | Calabrese et al. |
| 2018/0173404 A1 | 6/2018 | Smith |
| 2018/0348986 A1 | 12/2018 | Sawaki |
| 2019/0018479 A1 | 1/2019 | Minami |
| 2019/0018498 A1 | 1/2019 | West et al. |
| 2019/0050062 A1 | 2/2019 | Chen et al. |
| 2019/0130622 A1 | 5/2019 | Hoover et al. |
| 2019/0155495 A1 | 5/2019 | Klein et al. |
| 2019/0164340 A1 | 5/2019 | Pejic et al. |
| 2019/0228589 A1 | 7/2019 | Dascola et al. |
| 2019/0340832 A1 | 11/2019 | Srinivasan et al. |
| 2019/0349575 A1 | 11/2019 | Knepper et al. |
| 2020/0045249 A1 | 2/2020 | Francois et al. |
| 2020/0048825 A1 | 2/2020 | Schultz et al. |
| 2020/0128227 A1 | 4/2020 | Chavez et al. |
| 2020/0135141 A1 | 4/2020 | Day et al. |
| 2020/0214682 A1 | 7/2020 | Zaslavsky et al. |
| 2020/0286299 A1 | 9/2020 | Wang et al. |
| 2020/0379626 A1 | 12/2020 | Guyomard et al. |
| 2021/0034319 A1 | 2/2021 | Wang et al. |
| 2021/0225043 A1 | 7/2021 | Tang et al. |
| 2021/0241483 A1 | 8/2021 | Dryer et al. |
| 2021/0279967 A1 | 9/2021 | Gernoth et al. |
| 2021/0295592 A1* | 9/2021 | von Cramon ............ G06N 3/08 |
| 2021/0383097 A1 | 12/2021 | Guerard et al. |
| 2022/0084279 A1 | 3/2022 | Lindmeier et al. |
| 2022/0148257 A1* | 5/2022 | Boubekeur ........... G06T 15/506 |
| 2022/0317776 A1 | 10/2022 | Sundstrom et al. |
| 2022/0335697 A1 | 10/2022 | Harding et al. |
| 2022/0413691 A1 | 12/2022 | Becker et al. |
| 2023/0030699 A1 | 2/2023 | Zion et al. |
| 2023/0031832 A1 | 2/2023 | Lipton et al. |
| 2023/0032771 A1 | 2/2023 | Zion et al. |
| 2023/0076326 A1* | 3/2023 | Xu .......................... A63F 13/52 |
| 2023/0119162 A1 | 4/2023 | Lipton et al. |
| 2023/0290042 A1 | 9/2023 | Casella et al. |
| 2023/0377259 A1 | 11/2023 | Becker et al. |
| 2023/0377299 A1 | 11/2023 | Becker et al. |
| 2023/0377300 A1 | 11/2023 | Becker et al. |
| 2024/0037886 A1 | 2/2024 | Chiu et al. |
| 2024/0103636 A1 | 3/2024 | Lindmeier et al. |
| 2024/0104875 A1 | 3/2024 | Couche et al. |
| 2024/0104876 A1 | 3/2024 | Couche et al. |

FOREIGN PATENT DOCUMENTS

| | | |
|---|---|---|
| WO | 2019/213111 A1 | 11/2019 |
| WO | 2022/147146 A1 | 7/2022 |

OTHER PUBLICATIONS

Area Light, Available online at: https://manual.keyshot.com/manual/materials/material-types/light-sources/area-light/, [retrieved on Jun. 9, 2023], 24 pages.

Feature Highlights, Available online at: https://manual.keyshot.com/manual/whats-new/feature-highlights/, [retrieved on Jun. 9, 2023], 28 pages.

International Search Report received for PCT Patent Application No. PCT/US2021/049520, dated Apr. 8, 2022, 8 pages.

Light Manager, Available online at: https://manual.keyshot.com/manual/lighting/lighting-manager/, [retrieved on Jun. 9, 2023], 3 pages.

Non-Final Office Action received for U.S. Appl. No. 17/469,788, dated Mar. 2, 2023, 22 pages.

Non-Final Office Action received for U.S. Appl. No. 17/807,226, dated Jun. 26, 2023, 21 pages.

Artec Leo Full 3D Scanning Demo w/ Sample Data, Digitize Designs, LLC, Available online at: < https://www.youtube.com/watch?v=ecBKo_h3Pug>, [retrieved on Sep. 1, 2022], Feb. 22, 2019, 3 pages.

Final Office Action received for U.S. Appl. No. 17/469,788, mailed on Nov. 16, 2023, 24 pages.

Final Office Action received for U.S. Appl. No. 17/807,226, mailed on Nov. 30, 2023, 23 pages.

Final Office Action received for U.S. Appl. No. 17/812,965, mailed on Jan. 31, 2024, 9 pages.

Slambekova, Dana, "Gaze and Gesture Based Object Interaction in Virtual World", [retrieved on 2015-12-17]. Retrieved from the Internet: < URL:https://www.cs.rit.edu/~dxs4659/Report.pdf>, May 31, 2012, 54 pages.

International Search Report received for PCT Patent Application No. PCT/US2022/071208, mailed on Aug. 18, 2022, 9 pages.

International Search Report received for PCT Patent Application No. PCT/US2023/074955, mailed on Feb. 1, 2024, 6 pages.

Non-Final Office Action received for U.S. Appl. No. 17/469,788, mailed on Mar. 21, 2024, 24 pages.

Non-Final Office Action received for U.S. Appl. No. 17/812,965, mailed on Jun. 8, 2023, 8 pages.

Non-Final Office Action received for U.S. Appl. No. 17/814,455, mailed on Feb. 16, 2024, 24 pages.

Non-Final Office Action received for U.S. Appl. No. 17/814,462, mailed on Feb. 1, 2024, 30 pages.

Non-Final Office Action received for U.S. Appl. No. 17/905,483, mailed on Mar. 27, 2024, 16 pages.

Non-Final Office Action received for U.S. Appl. No. 18/317,893, mailed on Apr. 25, 2024, 18 pages.

Notice of Allowance received for U.S. Appl. No. 18/317,893, mailed on Mar. 6, 2024, 8 pages.

(56) References Cited

OTHER PUBLICATIONS

Notice of Allowance received for U.S. Appl. No. 18/317,893, mailed on Nov. 22, 2023, 9 pages.
Restriction Requirement received for U.S. Appl. No. 17/905,483, mailed on Dec. 7, 2023, 7 pages.
Search Report received for United Kingdom Patent Application No. GB2210885.6, mailed on Jan. 27, 2023, 1 page.
CAS and Chary XR, "Oculus Go & Your Phone As 2nd Controller!—An Inexpensive Way To Play PC VR Games", posted on Mar. 8, 2019, https://www.youtube.com/watch?v=i_iRVa0kemw, 2019, 4 pages.
Gamedbharat, "I Want to Rotate a Object on Double Tap, Can Any One Help Me With This?", posted on Jul. 26, 2017, https://discussions.unity.com/t/i-want-to-rotate-a-object-on-double-tap-can-any-one-help-me-with-this/192010, 2017, 3 pages.
Locher et al., "Mobile Phone and Cloud—a Dream Team for 3D Reconstruction", 2016 IEEE Winter Conference on Applications of Computer Vision (WACV), 2016, pp. 1-8.

* cited by examiner

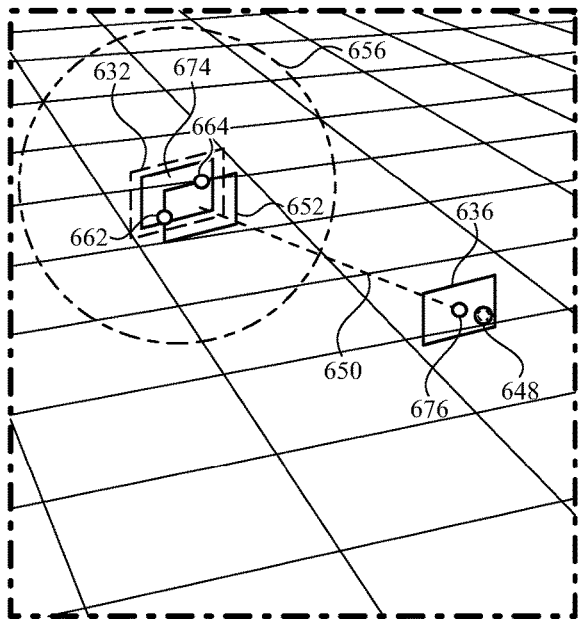 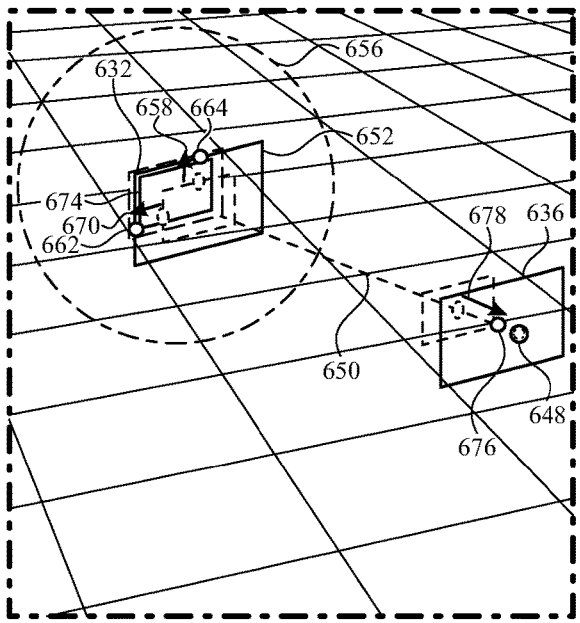
FIG. 6A        FIG. 6B
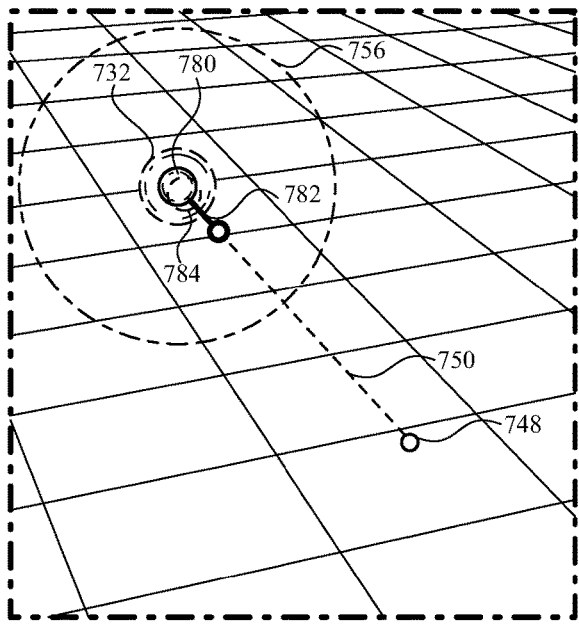 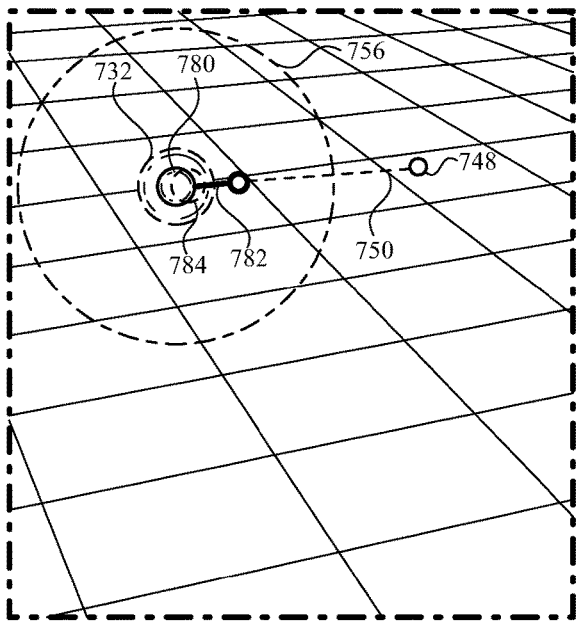
FIG. 7A        FIG. 7B

TECHNIQUES FOR MANIPULATING COMPUTER GRAPHICAL LIGHT SOURCES

CROSS-REFERENCE TO RELATED APPLICATIONS

This application claims the benefit of U.S. Provisional Application No. 63/216,399, filed Jun. 29, 2021, the content of which is hereby incorporated by reference in its entirety for all purposes.

FIELD OF THE DISCLOSURE

This relates generally to computer graphics editors.

BACKGROUND OF THE DISCLOSURE

Some computer graphical environments provide two-dimensional and/or three-dimensional environments where at least some objects and light sources displayed for a user's viewing are virtual and generated by a computer. In some uses, a user may create or modify computer graphical environments, such as by editing, generating, or otherwise manipulating computer graphical virtual objects and light sources using a content generation environment, such as a graphics editor or graphics editing interface. Editors that allow for intuitive editing of computer-generated virtual objects and light sources are desirable.

SUMMARY OF THE DISCLOSURE

Some examples of the disclosure are directed to computer-generated light source manipulators having one or more affordances for manipulating computer-generated virtual light sources. Different types of virtual light sources can be utilized including, but not limited to, virtual point light sources, virtual spot light sources, virtual frustum light sources, virtual area light sources, virtual directional light sources, and virtual ambient light sources. In some examples, selection of a particular virtual light source can cause a particular light source manipulator tailored for that virtual light source to be displayed over the virtual light source. The light source manipulators can include various lines, circles and the like that can define starting boundaries (e.g., surfaces that represent the start location and initial aperture of light emission from the virtual light source), ending boundaries (e.g., surfaces that represent the extent or reach (i.e., end location or projection distance) and final aperture of light transmission from the virtual light source), and fade boundaries (e.g., surfaces that represent the beginning of the fading of the virtual light source). The light source manipulators can also include one or more affordances for adjusting these boundaries. The affordances can include disc affordances for adjusting boundaries (e.g., adjusting a radius of a radial boundary, adjusting one dimension of a two-dimensional planar boundary, and adjusting an axial length of an axial boundary). The affordances can also include spherical affordances for three-dimensional (3D) adjustment of a virtual light source.

The examples described below provide ways to add and adjust computer-generated virtual light sources in a computer-generated 3D environment such as an extended reality (XR) environment. Efficient user interfaces for manipulating these virtual light sources improve the speed and accuracy of creating the desired lighting for the environment, and enhance the user experience by reducing the number of separate interfaces and interactions needed to create the desired lighting. Enhancing interactions with a device reduces the amount of time needed by a user to perform operations, and thus can reduce power usage and increase battery life for battery-powered devices.

The full descriptions of these examples are provided in the Drawings and the Detailed Description, and it is understood that this Summary does not limit the scope of the disclosure in any way.

BRIEF DESCRIPTION OF THE DRAWINGS

For a better understanding of the various described embodiments, reference should be made to the Detailed Description below, in conjunction with the following drawings in which like reference numerals often refer to corresponding parts throughout the figures.

FIG. 6A illustrates an authoring environment GUI including a virtual area light source and an area light source manipulator according to some examples of the disclosure.

FIG. 6B illustrates the adjustment of an initial aperture boundary and a final aperture boundary of an area light source manipulator for a selected virtual area light source according to examples of the disclosure.

FIG. 7A illustrates an authoring environment GUI including a virtual directional light source and a directional light source manipulator according to some examples of the disclosure.

FIG. 7B illustrates the adjustment of a directional light source manipulator for a selected virtual directional light source according to examples of the disclosure.

DETAILED DESCRIPTION

Figure 1:
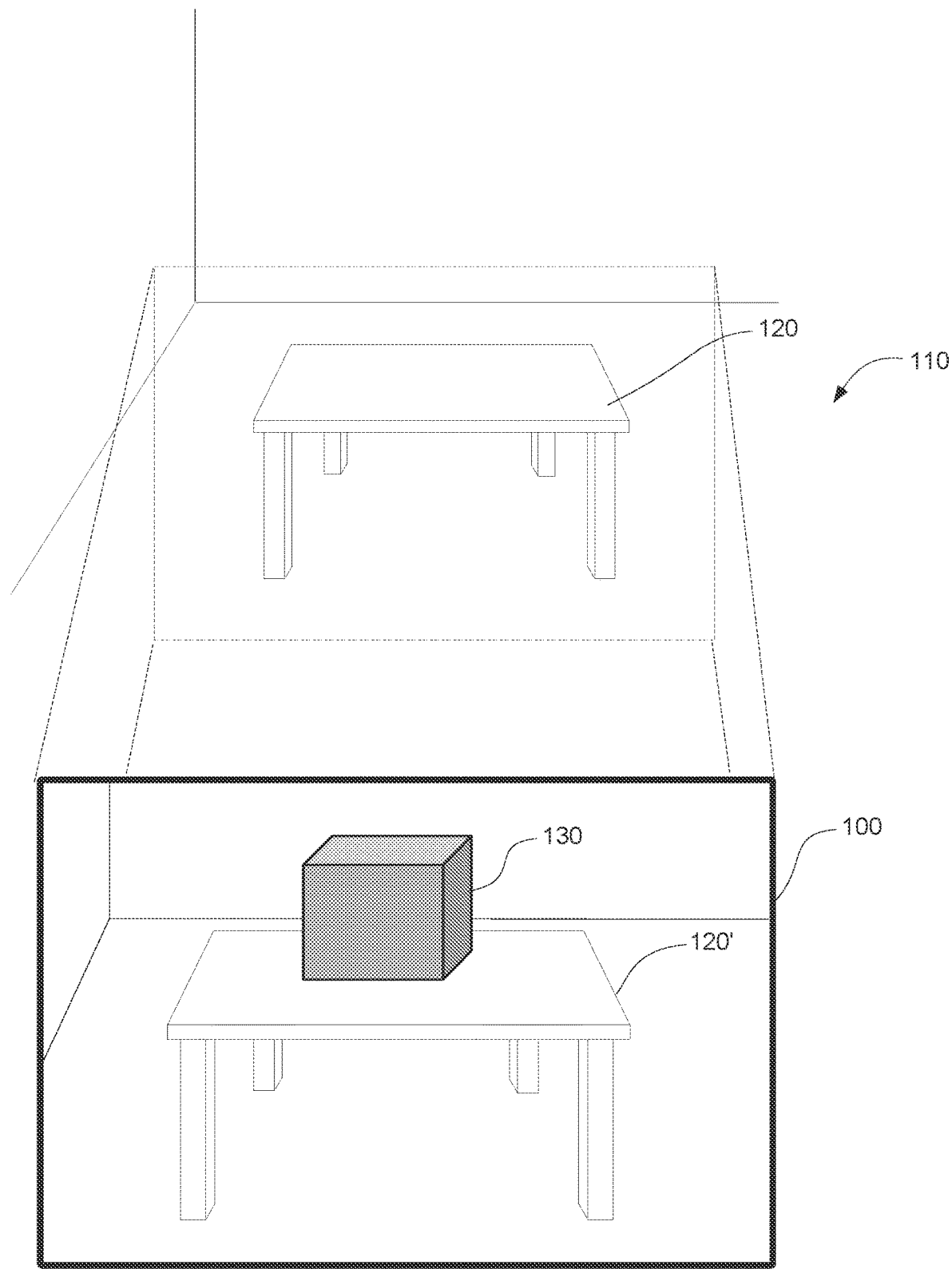
FIG. 1 illustrates an electronic device displaying an XR environment (e.g., a computer-generated environment) according to examples of the disclosure.

Computer graphical environments such as XR environments can include XR content. In some embodiments, XR content can be presented to the user via an XR file that includes data representing the XR content and/or data describing how the XR content is to be presented. In some embodiments, the XR file includes data representing one or more XR scenes and one or more triggers for presentation of the one or more XR scenes. For example, an XR scene may be anchored to a horizontal, planar surface, such that when a horizontal, planar surface is detected (e.g., in the field of view of one or more cameras), the XR scene can be presented. The XR file can also include data regarding one or more virtual objects or light sources associated with the XR scene, and/or associated triggers and actions involving the XR virtual objects or light sources.

In order to simplify the generation of XR files and/or editing of computer-generated graphics generally, a computer graphics editor including a content generation environment (e.g., an authoring environment GUI) can be used. In some embodiments, a content generation environment is itself an XR environment (e.g., a two-dimensional and/or three-dimensional environment). For example, a content generation environment can include one or more virtual objects or light sources and one or more representations of real world objects. In some embodiments, the virtual objects or light sources are superimposed over a physical environment, or a representation thereof.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an XR environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

In some embodiments, the physical environment is captured via one or more cameras of the electronic device and is actively displayed in the XR environment (e.g., via the display generation component). In some embodiments, the physical environment is (e.g., passively) provided by the electronic device, for example, if the display generation component includes a translucent or transparent element through which the user is able to see the physical environment.

In such a content generation environment, a user can create virtual objects or light sources from scratch (including the appearance of the virtual objects or light sources, behaviors/actions of the virtual objects or light sources, and/or triggers for the behaviors/actions of the virtual objects or light sources). Additionally or alternatively, virtual objects or light sources can be created by other content creators and imported into the content generation environment, where the virtual objects or light sources can be placed into an XR environment or scene. In some embodiments, virtual objects or light sources generated in a content generation environment or entire environments can be exported to other environments or XR scenes (e.g., via generating an XR file and importing or opening the XR file in a computer graphics editor application or XR viewer application).

In some embodiments, the authoring environment GUI can include one or more graphical user interface elements to enable one or more transformations of a virtual object or light source. A graphical user interface element to transform a virtual object or light source can be referred to herein as a "manipulator" or "manipulator element." The manipulator can be used to perform move, rotate or scale actions on the virtual object, or change the type, shape, range, extent or reach (i.e., projection distance) and direction of the virtual light source. In some embodiments, the manipulator can provide multiple elements to enable multiple transformation actions. In some embodiments, the manipulator can provide the ability to perform move, rotate and scale actions on the virtual object, or provide the ability change the shape, range extent or reach (projection distance) and direction of the virtual light source (e.g., as described herein with respect to light source manipulators). As used herein, the term "affordance" refers to a user-interactive graphical user interface manipulator that is, optionally, displayed on a display generation component.

Some examples of the disclosure are directed to computer-generated light source manipulators having one or more affordances for manipulating computer-generated virtual light sources. Different types of virtual light sources can be utilized including, but not limited to, virtual point light sources, virtual spot light sources, virtual frustum light sources, virtual area light sources, virtual directional light sources, and virtual ambient light sources. In some examples, selection of a particular virtual light source can cause a particular light source manipulator tailored for that virtual light source to be displayed over the virtual light source. The light source manipulators can include various lines, circles and the like that can define starting boundaries (e.g., surfaces that represent the start location and initial aperture of light emission from the virtual light source), ending boundaries (e.g., surfaces that represent the extent or reach (i.e., end location or projection distance) and final aperture of light transmission from the virtual light source), and fade boundaries (e.g., surfaces that represent the beginning of the fading of the virtual light source). The light source manipulators can also include one or more affordances for adjusting these boundaries. The affordances can include disc affordances for adjusting boundaries (e.g., adjusting a radius of a radial boundary, adjusting one dimension of a two-dimensional planar boundary, and adjusting an axial length of an axial boundary). The affordances can also include spherical affordances for 3D adjustment of a virtual light source.

There are many different types of electronic systems that enable a person to sense and/or interact with various XR environments. Embodiments of electronic devices and user interfaces for such systems are described. In some embodiments, the device is a portable communications device, such as a laptop or tablet computer. In some embodiments, the device is a mobile telephone that also contains other functions, such as personal digital assistant (PDA) and/or music player functions. In some embodiments, the device is a wearable device, such as a watch, a head-mounted display, etc.

Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

It should also be understood that, in some embodiments, the device is not a portable communications device, but is a desktop computer or a television. In some embodiments, the portable and non-portable electronic devices may optionally include touch-sensitive surfaces (e.g., touch screen displays and/or touch pads). In some embodiments, the device does not include a touch-sensitive surface (e.g., a touch screen display and/or a touch pad), but rather is capable of outputting display information (such as the user interfaces of the disclosure) for display on an integrated or external display device, and capable of receiving input information from an integrated or external input device having one or more input mechanisms (such as one or more buttons, a mouse, a touch screen display, stylus, and/or a touch pad). In some embodiments, the device has a display, but is capable of receiving input information from a separate input device having one or more input mechanisms (such as one or more buttons, a mouse, a touch screen display, and/or a touch pad).

In the discussion that follows, an electronic device that is in communication with a display generation component and one or more input devices is described. It should be understood, that the electronic device optionally is in communication with one or more other physical user-interface devices, such as touch-sensitive surface, a physical keyboard, a mouse, a joystick, a hand tracking device, an eye tracking device, a stylus, etc. Further, as described above, it should be understood that the described electronic device, display and touch-sensitive surface are optionally distributed amongst two or more devices. Therefore, as used in this disclosure, information displayed on the electronic device or by the electronic device is optionally used to describe information outputted by the electronic device for display on a separate display device (touch-sensitive or not). Similarly, as used in this disclosure, input received on the electronic device (e.g., touch input received on a touch-sensitive surface of the electronic device, or touch input received on the surface of a stylus) is optionally used to describe input received on a separate input device, from which the electronic device receives input information.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a television channel browsing application, and/or a digital video player application. Additionally, the device may support an application for generating or editing content for computer generated graphics and/or XR environments (e.g., an application with a content generation environment).

The various applications that are executed on the device optionally use a common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

FIG. 1 illustrates an electronic device 100 displaying an XR environment (e.g., a computer-generated environment) according to examples of the disclosure. In some embodiments, electronic device 100 is a hand-held or mobile device, such as a tablet computer, laptop computer, smartphone, or head-mounted display. Examples of device 100 are described below with reference to the architecture block diagram of FIG. 2. As shown in FIG. 1, electronic device 100 and table 120 are located in the physical environment 110. In some embodiments, electronic device 100 may be configured to capture areas of physical environment 110 including table 120 (illustrated in the field of view of electronic device 100). In some embodiments, in response to a trigger, the electronic device 100 may be configured to display a virtual object 130 in the computer-generated environment (e.g., represented by a cube illustrated in FIG. 1) that is not present in the physical environment 110, but is displayed in the computer generated environment positioned on (e.g., anchored to) the top of a computer-generated representation 120' of real-world table 120. For example, virtual object 130 can be displayed on the surface of the table 120' in the computer-generated environment displayed via device 100 in response to detecting the planar surface of table 120 in the physical environment 110. It should be understood that virtual object 130 is a representative virtual object and one or more different virtual objects (e.g., of various dimensionality such as two-dimensional or three-dimensional virtual objects) can be included and rendered in a three-dimensional computer-generated environment. For example, the virtual object can represent an application or a user interface displayed in the computer-generated environment. In some examples, the application or user interface can include the display of content items (e.g., photos, video, etc.) of a content application. Additionally, it should be understood, that the 3D environment (or 3D virtual object) described herein may be a representation of a 3D environment (or three-dimensional virtual object) displayed in a two dimensional (2D) context (e.g., displayed on a 2D screen).

Figure 2:
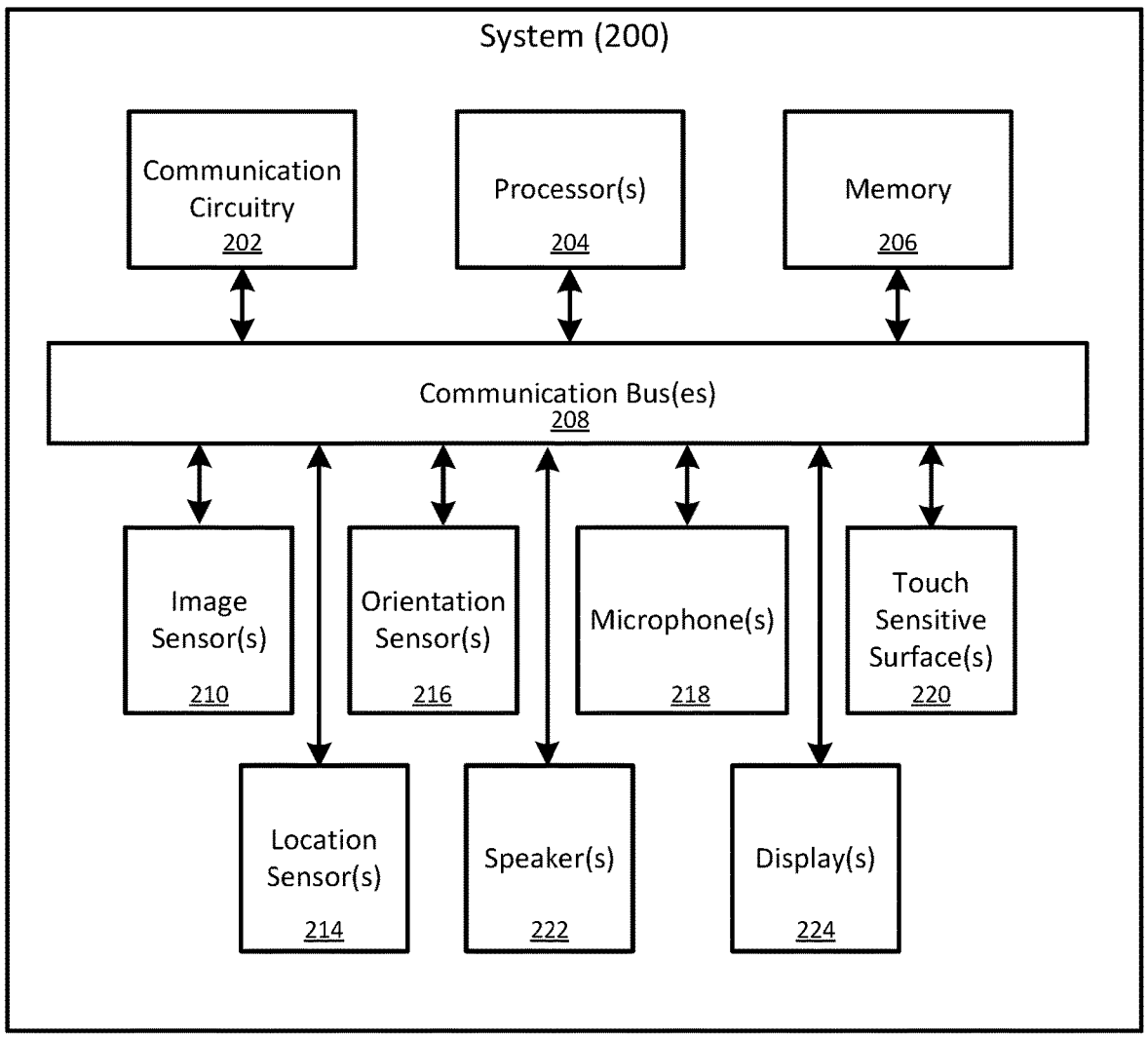
FIG. 2 illustrates a block diagram of an exemplary architecture for a system or device according to examples of the disclosure.

FIG. 2 illustrates a block diagram of an exemplary architecture for a system or device 200 according to examples of the disclosure. In some embodiments, device 200 is a mobile device, such as a mobile phone (e.g., smart phone), a tablet computer, a laptop computer, a desktop computer, a head-mounted display, an auxiliary device in communication with another device, etc. In some embodiments, as illustrated in FIG. 2, device 200 includes various components, such as communication circuitry 202, processor(s) 204, memory 206, image sensor(s) 210, location sensor(s) 214, orientation sensor(s) 216, microphone(s) 218, touch-sensitive surface(s) 220, speaker(s) 222, display generation component(s) 224, hand tracking sensor(s) 230, and/or eye tracking sensor(s) 232. These components optionally communicate over communication bus(es) 208 of device 200.

Device 200 includes communication circuitry 202. Communication circuitry 202 optionally includes circuitry for communicating with electronic devices, networks, such as the Internet, intranets, a wired network and/or a wireless network, cellular networks and wireless local area networks (LANs). Communication circuitry 202 optionally includes circuitry for communicating using near-field communication (NFC) and/or short-range communication, such as Bluetooth®.

Processor(s) 204 include one or more general processors, one or more graphics processors, and/or one or more digital signal processors. In some embodiments, memory 206 a non-transitory computer-readable storage medium (e.g., flash memory, random access memory, or other volatile or non-volatile memory or storage) that stores computer-readable instructions configured to be executed by processor(s) 204 to perform the techniques, processes, and/or methods described below. In some embodiments, memory 206 can including more than one non-transitory computer-readable storage medium. A non-transitory computer-readable storage medium can be any medium (e.g., excluding a signal) that can tangibly contain or store computer-executable instructions for use by or in connection with the instruction execution system, apparatus, or device. In some embodiments, the storage medium is a transitory computer-readable storage medium. In some embodiments, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like.

Device 200 includes display generation component(s) 224. In some embodiments, display generation component(s) 224 include a single display (e.g., a liquid-crystal display (LCD), organic light-emitting diode (OLED), or other types of display). In some embodiments, display generation component(s) 224 includes multiple displays. In some embodiments, display generation component(s) 224 can include a display with touch capability (e.g., a touch screen), a projector, a holographic projector, a retinal projector, etc. In some embodiments, device 200 includes touch-sensitive surface(s) 220 for receiving user inputs, such as tap inputs and swipe inputs or other gestures. In some embodiments, display generation component(s) 224 and touch-sensitive surface(s) 220 form touch-sensitive display(s) (e.g., a touch screen integrated with device 200 or external to device 200 that is in communication with device 200).

Device 200 optionally includes image sensor(s) 210. Image sensors(s) 210 optionally include one or more visible light image sensor, such as charged coupled device (CCD) sensors, and/or complementary metal-oxide-semiconductor (CMOS) sensors operable to obtain images of physical objects from the real-world environment. Image sensor(s) 210 also optionally include one or more infrared (IR) sensors, such as a passive or an active IR sensor, for detecting infrared light from the real-world environment. For example, an active IR sensor includes an IR emitter for emitting infrared light into the real-world environment. Image sensor(s) 210 also optionally include one or more cameras configured to capture movement of physical objects in the real-world environment. Image sensor(s) 210 also optionally include one or more depth sensors configured to detect the distance of physical objects from device 200. In some embodiments, information from one or more depth sensors can allow the device to identify and differentiate objects in the real-world environment from other objects in the real-world environment. In some embodiments, one or more depth sensors can allow the device to determine the texture and/or topography of objects in the real-world environment.

In some embodiments, device 200 uses CCD sensors, event cameras, and depth sensors in combination to detect the physical environment around device 200. In some embodiments, image sensor(s) 220 include a first image sensor and a second image sensor. The first image sensor and the second image sensor work in tandem and are optionally configured to capture different information of physical objects in the real-world environment. In some embodiments, the first image sensor is a visible light image sensor and the second image sensor is a depth sensor. In some embodiments, device 200 uses image sensor(s) 210 to detect the position and orientation of device 200 and/or display generation component(s) 224 in the real-world environment. For example, device 200 uses image sensor(s) 210 to track the position and orientation of display generation component(s) 224 relative to one or more fixed objects in the real-world environment.

In some embodiments, device 200 includes microphones(s) 218 or other audio sensors. Device 200 uses microphone(s) 218 to detect sound from the user and/or the real-world environment of the user. In some embodiments, microphone(s) 218 includes an array of microphones (a plurality of microphones) that optionally operate in tandem, such as to identify ambient noise or to locate the source of sound in space of the real-world environment.

Device 200 includes location sensor(s) 214 for detecting a location of device 200 and/or display generation component(s) 224. For example, location sensor(s) 214 can include a GPS receiver that receives data from one or more satellites and allows device 200 to determine the device's absolute position in the physical world.

Device 200 includes orientation sensor(s) 216 for detecting orientation and/or movement of device 200 and/or display generation component(s) 224. For example, device 200 uses orientation sensor(s) 216 to track changes in the position and/or orientation of device 200 and/or display generation component(s) 224, such as with respect to physical objects in the real-world environment. Orientation sensor(s) 216 optionally include one or more gyroscopes and/or one or more accelerometers.

Device 200 includes hand tracking sensor(s) 230 and/or eye tracking sensor(s) 232, in some embodiments. Hand tracking sensor(s) 230 are configured to track the position/location of one or more portions of the user's hands, and/or motions of one or more portions of the user's hands with respect to the extended reality environment, relative to the display generation component(s) 224, and/or relative to another defined coordinate system. Eye tracking senor(s) 232 are configured to track the position and movement of a user's gaze (eyes, face, or head, more generally) with respect to the real-world or extended reality environment and/or relative to the display generation component(s) 224. In some embodiments, hand tracking sensor(s) 230 and/or eye tracking sensor(s) 232 are implemented together with the display generation component(s) 224. In some embodiments, the hand tracking sensor(s) 230 and/or eye tracking sensor(s) 232 are implemented separate from the display generation component(s) 224.

In some embodiments, the hand tracking sensor(s) 230 can use image sensor(s) 210 (e.g., one or more IR cameras, 3D cameras, depth cameras, etc.) that capture three-dimensional information from the real-world including one or more hands (e.g., of a human user). In some examples, the hands can be resolved with sufficient resolution to distinguish fingers and their respective positions. In some embodiments, one or more image sensor(s) 210 are positioned relative to the user to define a field of view of the image sensor(s) and an interaction space in which finger/hand position, orientation and/or movement captured by the image sensors are used as inputs (e.g., to distinguish from a user's resting hand or other hands of other persons in the real-world environment). Tracking the fingers/hands for input (e.g., gestures) can be advantageous in that it does not require the user to touch, hold or wear any sort of beacon, sensor, or other marker.

In some embodiments, eye tracking sensor(s) 232 includes at least one eye tracking camera (e.g., infrared (IR) cameras) and/or illumination sources (e.g., IR light sources, such as LEDs) that emit light towards a user's eyes. The eye tracking cameras may be pointed towards a user's eyes to receive reflected IR light from the light sources directly or indirectly from the eyes. In some embodiments, both eyes are tracked separately by respective eye tracking cameras and illumination sources, and a focus/gaze can be determined from tracking both eyes. In some embodiments, one eye (e.g., a dominant eye) is tracked by a respective eye tracking camera/illumination source(s).

Device 200 is not limited to the components and configuration of FIG. 2, but can include fewer, other, or additional components in multiple configurations. A person using device 200, is optionally referred to herein as a user of the device. Attention is now directed towards examples of user interfaces ("UI") and associated processes that are implemented on an electronic device, such as device 100 and device 200. The UIs can be part of a computer graphics editor that may include a display of a computer graphics editing environment.

In various examples of the disclosure, virtual light sources can be added to an XR environment or scene to add customizable lighting to that scene. To accomplish this, as discussed above, one or more virtual light sources can be imported or selected from a content library and included in the 3D environment. In some examples, the 3D environment (including a 3D virtual light source) may be a representation of a 3D environment (including a representation of a 3D virtual light source) displayed in a two dimensional (2D) context (e.g., displayed on a 2D screen). In some examples, the 3D environment can display gridlines or other indicators to assist a content creator with placement and/or size of a virtual light source in the 3D environment. Efficient user interfaces for manipulating these virtual light sources improve the speed and accuracy of creating the desired lighting for the environment, and enhance the user experience by reducing the number of separate interfaces and interactions needed to create the desired lighting. Enhancing interactions with a device reduces the amount of time needed by a user to perform operations, and thus can reduce power usage and increase battery life for battery-powered devices.

Figure 3A:
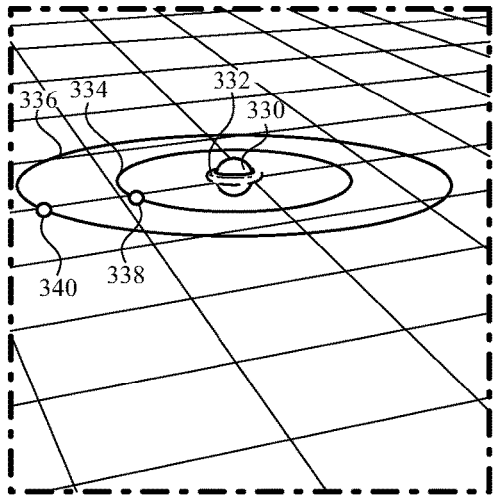
FIG. 3A illustrates an authoring environment graphical user interface (GUI) including a virtual point light source and a point light source manipulator according to some examples of the disclosure.

FIG. 3A illustrates an authoring environment GUI including virtual point light source 330 and a point light source manipulator according to some examples of the disclosure. Virtual point light source 330 can emit light in all directions within the authoring environment. The authoring environment GUI can be displayed on an electronic device (e.g., similar to device 100 or 200) including, but not limited to, portable or non-portable computing devices such as a tablet computing device, laptop computing device or desktop computing device. FIG. 3A illustrates a 3D environment defined by X, Y and Z axes in a first mode of operation (e.g., a scene editing mode) and including virtual point light source 330 that has been imported or selected from a content library and added to the environment. In the example of FIG. 3A, virtual point light source 330 is displayed as a sphere, but it should be understood that the sphere is merely representative, and that the virtual point light source can be represented in other forms, such as a point, a disc, and the like.

The location of virtual point light source 330 in the 3D environment of FIG. 3A can be determined in a number of ways, such as by selecting and relocating the virtual point light source from an initial default location using a displayed cursor or other location indicator, or using a finger or stylus touching or hovering over the virtual point light source without any visible indicator being displayed, or by configuring a virtual light source properties pane that may appear as an overlay in the 3D environment or may be displayed in a window outside the 3D environment. The color of virtual point light source 330 can also be set using the virtual light source properties pane. Selection of virtual point light source 330 by a finger/stylus touch or tap over the virtual point light source, or alternatively a mouse click or other selection action, can activate the virtual point light source for editing and cause a point light source manipulator to appear.

In the example of FIG. 3A, virtual point light source 330 has been selected and placed at the location shown, and a point light source manipulator has been displayed over the virtual point light source. In some examples, the point light source manipulator can include shroud 332 (which in the context of virtual point light source 330 does not indicate light directionality or the blocking of light), radial fade boundary 334, and radial projection boundary 336. Although radial fade boundary 334 and radial projection boundary 336 appear in the same X-Y plane in the example of FIG. 3A, in other examples each of the boundaries can appear in different planes. In the example of FIG. 3A, shroud 332 can appear as a ring around virtual point light source 330, with the ring lying in the same X-Y place as radial fade boundary 334 and radial projection boundary 336. Radial fade boundary 334 indicates the start of the fading of the illumination strength of virtual point light source 330, and radial projection boundary 336 indicates the farthest radial reach or extent of the virtual point light source. For example, the light intensity of virtual point light source 330 can remain constant from the point light source to radial fade boundary 334, and thereafter from the radial fade boundary to radial projection boundary 336 the light intensity can drop off linearly or nonlinearly according to a selected equation until it reaches the radial projection boundary. At radial projection boundary 336, the light intensity can be zero, or in some instances nonzero, but beyond the radial projection boundary there can be no light intensity produced by virtual point light source 330.

The point light source manipulator can also include radial fade affordance 338 and radial projection affordance 340. Although the example of FIG. 3A shows radial fade affordance 338 and radial projection affordance 340 in radial alignment, in other examples they may be located anywhere along their respective boundaries. The flat disc shape of radial fade affordance 338 and radial projection affordance 340 can intuitively suggest that these affordances can be manipulated in only a single direction, such as a radial direction. However, although radial fade affordance 338 and radial projection affordance 340 appear as flat circular discs whose origins and axes are radially aligned with virtual point light source 330, in other examples the affordances can appear as other shapes. Radial fade affordance 338 can be selected and repositioned (e.g., by touching or clicking, then dragging) to adjust the radius of radial fade boundary 334, with the limitation that the radius of the radial fade boundary cannot exceed the radius of radial projection boundary 336. Radial projection affordance 340 can be selected and repositioned (e.g., by touching or clicking, then dragging) to adjust the radius of radial projection boundary 336, with the limitation that the radius of the radial projection boundary cannot be less than the radius of radial fade boundary 334. The point light source manipulator and its affordances provide a visual indication of various characteristics of the virtual point light source and a visual means of manipulating those characteristics to enable efficient and accurate adjustments to the virtual point light source.

Figure 3B:
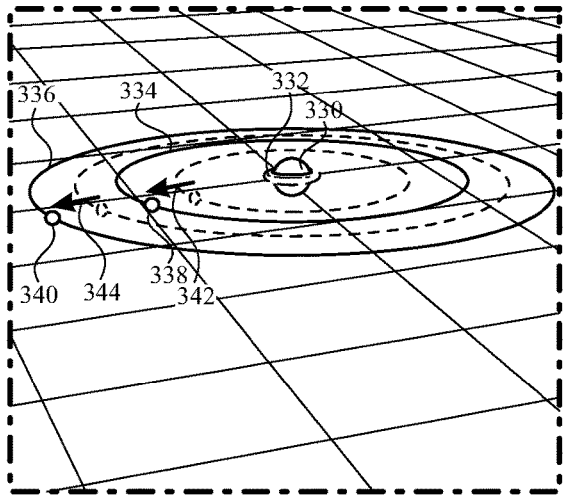
FIG. 3B illustrates the adjustment of a radial fade boundary and a radial projection boundary of a point light source manipulator for a selected virtual point light source according to examples of the disclosure.

FIG. 3B illustrates the adjustment of radial fade boundary 334 and radial projection boundary 336 of a point light source manipulator for selected virtual point light source 330 according to examples of the disclosure. In the example of FIG. 3B, radial fade affordance 338 has been selected and repositioned (from its previous location in dashed outline to its current location as a solid line disc) as indicated by arrow 342, and radial projection affordance 340 has been separately selected and repositioned (from its previous location in dashed outline to its current location as a solid line disc) as indicated by arrow 344. Note that although FIG. 3B shows both affordances being repositioned in the same direction (i.e., with increasing radius) to increase both radial fade boundary 334 and radial projection boundary 336, because the affordances are independent, in other examples the radial fade and projection boundaries can both be decreased, or one can be increased while the other is decreased. Note that because virtual point light source 330 emits light in all directions, although radial fade boundary 334 and radial projection boundary 336 only appear to change in the X-Y direction in FIG. 3B, the radial fade and projection boundaries of the virtual light source change in all directions.

In some examples, the point light source manipulator can be maintained at a default size, even while the 3D environment, virtual point light source 330, and any virtual objects in the environment are zoomed in or out. Maintaining the point light source manipulator at a default size can enable the point light source manipulator to maintain its ease of use, even when virtual point light source 330 and virtual objects are very small. However, in other examples, the point light source manipulator can grow or shrink as the 3D environment and virtual point light source 330 are zoomed out or in.

Figure 4A:
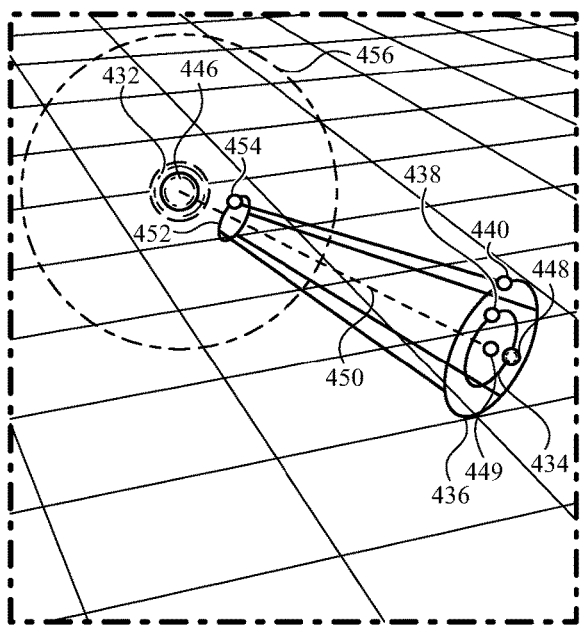
FIG. 4A illustrates an authoring environment GUI including a virtual spot light source and a spot light source manipulator according to some examples of the disclosure.

FIG. 4A illustrates an authoring environment GUI including virtual spot light source 446 and a spot light source manipulator according to some examples of the disclosure. Virtual spot light source 446 can emit light in a generally cone-shaped pattern within the authoring environment. The authoring environment GUI can be displayed on an electronic device (e.g., similar to device 100 or 200) including, but not limited to, portable or non-portable computing devices such as a tablet computing device, laptop computing device or desktop computing device. FIG. 4A illustrates a 3D environment defined by X, Y and Z axes in a first mode of operation (e.g., a scene editing mode) and including virtual spot light source 446 that has been imported or selected from a content library and added to the environment. In the example of FIG. 4A, virtual spot light source 446 is displayed as a sphere, but it should be understood that the sphere is merely representative, and that the virtual spot light source can be represented in other forms, such as a point, a disc, and the like.

The location of virtual spot light source 446 in the 3D environment of FIG. 4A can be determined in a number of ways, such as by selecting and relocating the virtual spot light source from an initial default location using a displayed cursor or other location indicator, or using a finger or stylus touching or hovering over the virtual spot light source without any visible indicator being displayed, or by configuring a virtual light source properties pane that may appear as an overlay in the 3D environment or may be displayed in a window outside the 3D environment. The color of virtual spot light source 446 can also be set using the virtual light source properties pane. Selection of virtual spot light source 446 by a finger/stylus touch or tap over the virtual spot light source, or alternatively a mouse click or other selection action, can activate the virtual spot light source for editing and cause a spot light source manipulator to appear.

In the example of FIG. 4A, virtual spot light source 446 has been selected and placed at the location shown, and a spot light source manipulator has been displayed over the virtual spot light source. In some examples, the spot light source manipulator can include shroud 432 (which in the context of virtual spot light source 446 can provide a visual indication that no light is emanating from the sides or back of the virtual spot light source), initial aperture boundary 452, radial fade boundary 434, and final aperture boundary 436. In the example of FIG. 4A, shroud 432 can appear as a ring around virtual spot light source 446, with the ring lying in a plane orthogonal to axis 450. Initial aperture boundary 452 can indicate the initial aperture and the starting point of virtual spot light source 446. In the example of FIG. 4A, radial fade boundary 434 and final aperture boundary 436 appear in the same plane, which can represent the axial projection distance of virtual spot light source 446. Radial fade boundary 434 indicates the start of the fading of the light intensity emanating from virtual spot light source 446 in the radial direction outward from axis 450, and final aperture boundary 436 indicates the farthest reach or projection of the virtual spot light source in the radial direction outward from the axis. For example, the light intensity of virtual spot light source 446 can remain constant from axis 450 outward to radial fade boundary 434, and thereafter the light intensity can drop off linearly or nonlinearly in a radial direction from the radial fade boundary outward to final aperture boundary 436 according to a selected fade equation until it reaches the final aperture boundary. At final aperture boundary 436, the light intensity can be zero, or in some instances nonzero. Beyond final aperture boundary 436 (either axially or radially) there may be no light intensity produced by virtual spot light source 446.

In some examples, the spot light source manipulator can also include radial initial aperture affordance 454, radial fade affordance 438, radial final aperture affordance 440, and axial projection and directional affordance 448. In other examples, affordance 448 can only be used for directional adjustments, and a separate axial projection affordance 449 can be provided for adjustments to the axial projection (extent or reach) of virtual spot light source 446. In some examples, in addition to (or in some instances as an alternative to) axial projection and directional affordance 448, the spot light source manipulator can also include directional affordance 456. Although the example of FIG. 4A shows radial fade affordance 438 and radial final aperture affordance 440 in radial alignment, in other examples they may be located anywhere along their respective boundaries. The flat disc shape of radial initial aperture affordance 454, radial fade affordance 438, axial projection affordance 449, and radial final aperture affordance 440 can intuitively suggest that these affordances can be manipulated in only a single direction, such as a radial or axial direction. However, although radial fade affordance 438, radial final aperture affordance 440, axial projection affordance 449, and radial initial aperture affordance 454 appear in the example of FIG. 4A as flat circular discs, in other examples the affordances can appear as other shapes. The spherical shape of axial projection and directional affordance 448 can intuitively suggest that this affordance can be moved in any direction (i.e., a multidirectional adjustment). However, although axial projection and directional affordance 448 appears as a sphere axially aligned with axis 450 of virtual spot light source 446 but beyond the extent or reach of final aperture boundary 436, in other examples the axial projection and directional affordance can appear as other shapes.

In some examples, radial initial aperture affordance 454 can be selected and repositioned (e.g., by touching or clicking, then dragging) in a radial direction with respect to axis 450 to adjust the radius of initial aperture boundary 452. As the radius of initial aperture boundary 452 is adjusted, in some examples the size of virtual spot light source 446 and shroud 432 can be automatically adjusted in correspondence with the tapering cone of the virtual spot light source. In other examples, there may be no radial initial aperture affordance 454 on initial aperture boundary 452, and the initial aperture boundary can be of a predetermined fixed radius. In these examples, initial aperture boundary 452 can be sized such that the tapered cone of virtual spot light source 446 originates at or about the center of the virtual spot light source. Radial fade affordance 438 can be selected and repositioned (e.g., by touching or clicking, then dragging) in a radial direction with respect to axis 450 to adjust the radius of radial fade boundary 434, with the limitation that the radius of the radial fade boundary cannot exceed the radius of final aperture boundary 436. Radial final aperture affordance 440 can be selected and repositioned (e.g., by touching or clicking, then dragging) in a radial direction with respect to axis 450 to adjust the radius of final aperture boundary 436, with the limitation that the radius of the final aperture boundary cannot be less than the radius of radial fade boundary 434. In some examples, axial projection and directional affordance 448 can be selected and repositioned (e.g., by touching or clicking, then dragging) in any direction in free space (i.e., multidirectional adjustment) to adjust the axial projection distance and direction of virtual spot light source 446. In other examples, affordance 448 can be selected and repositioned in any direction in free space to adjust only the direction of virtual spot light source 446, and axial projection affordance 449 can be selected and repositioned axially to adjust only the axial projection distance (extent or reach) of the virtual spot light source. Directional affordance 456 can have the appearance of a semitransparent sphere, and can be selected and repositioned (e.g., by touching or clicking, then dragging anywhere on the surface of the semitransparent sphere) to change the direction (but not the axial projection distance) of virtual spot light source 446 (i.e., a multidirectional adjustment). A sphere, as defined herein, can include a full sphere or a partial sphere. The spot light source manipulator and its affordances provide a visual indication of various characteristics of the virtual spot light source and a visual means of manipulating those characteristics to enable efficient and accurate adjustments to the virtual spot light source.

Figure 4B:
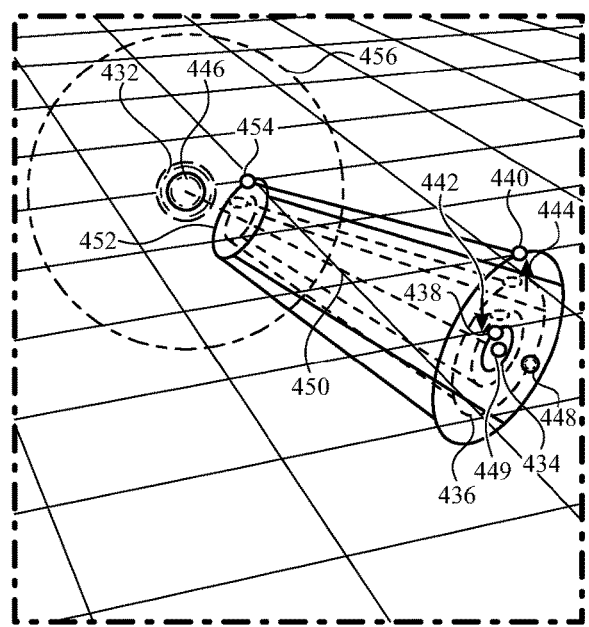
FIG. 4B illustrates the adjustment of an initial aperture boundary, a radial fade boundary, and a final aperture boundary of a spot light source manipulator for a selected virtual spot light source according to examples of the disclosure.

FIG. 4B illustrates the adjustment of initial aperture boundary 452, radial fade boundary 434 and final aperture boundary 436 of a spot light source manipulator for selected virtual spot light source 446 according to examples of the disclosure. In the example of FIG. 4B, radial initial aperture affordance 454 has been repositioned (from its previous location in dashed outline to its current location as a solid line disc) as indicated by arrow 458 to increase the radius of initial aperture boundary 452. In the example of FIG. 4B, although the radius of initial aperture boundary 452 has increased, the size of virtual spot light source 446 and shroud 432 has remained the same. However, in other examples not shown in FIG. 4B, virtual spot light source 446 and shroud 432 can change their size automatically depending on the size of initial aperture boundary 452. Radial fade affordance 438 has been repositioned (from its previous location in dashed outline to its current location as a solid line disc) as indicated by arrow 442 to increase the start of light intensity fading outward from axis 450. Radial final aperture affordance 440 has been repositioned (from its previous location in dashed outline to its current location as a solid line disc) as indicated by arrow 444 to increase the radius of final aperture boundary 436. Note that the directional changes of the affordances in FIG. 4B (i.e., to increase or decrease the size of the boundaries) are just examples, and that any of the affordances may be repositioned in any direction. Note that because virtual spot light source 446 emits light in the generally cone-shaped pattern defined by the boundaries in FIGS. 4A and 4B, no light from the virtual spot light source is present in the 3D scene outside of those boundaries.

In some examples, the spot light source manipulator can be maintained at a default size even when the 3D environment, virtual spot light source 446, and any virtual objects in the environment are zoomed in or out. Maintaining the spot light source manipulator at a default size can enable the spot light source manipulator to maintain its ease of use, even when virtual spot light source 446 and virtual objects are very small. However, in other examples, the spot light source manipulator can grow or shrink as the 3D environment and virtual spot light source 446 are zoomed out or in.

Figure 5A:
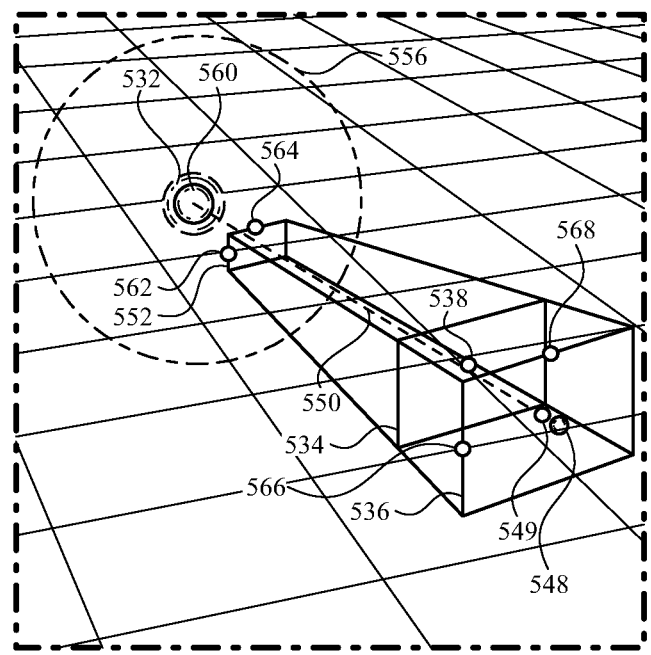
FIG. 5A illustrates an authoring environment GUI including a virtual frustum light source and a frustum light source manipulator according to some examples of the disclosure.

FIG. 5A illustrates an authoring environment GUI including virtual frustum light source 560 and a frustum light source manipulator according to some examples of the disclosure. Virtual frustum light source 560 can emit light in a generally frustum-shaped pattern within the authoring environment. The authoring environment GUI can be displayed on an electronic device (e.g., similar to device 100 or 200) including, but not limited to, portable or non-portable computing devices such as a tablet computing device, laptop computing device or desktop computing device. FIG. 5A illustrates a 3D environment defined by X, Y and Z axes in a first mode of operation (e.g., a scene editing mode) and including virtual frustum light source 560 that has been imported or selected from a content library and added to the environment. In the example of FIG. 5A, virtual frustum light source 560 is displayed as a sphere, but it should be understood that the sphere is merely representative, and that the virtual frustum light source can be represented in other forms, such as a rectangle, a point, a disc, and the like.

The location of virtual frustum light source 560 in the 3D environment of FIG. 5A can be determined in a number of ways, such as by selecting and relocating the virtual frustum light source from an initial default location using a displayed cursor or other location indicator, using a finger or stylus touching or hovering over the virtual frustum light source without any visible indicator being displayed, or by configuring a virtual light source properties pane that may appear as an overlay in the 3D environment or may be displayed in a window outside the 3D environment. The color of virtual frustum light source 560 can also be set using the virtual light source properties pane. Selection of virtual frustum light source 560 by a finger/stylus touch or tap over the virtual frustum light source, or alternatively a mouse click or other selection action, can activate the virtual frustum light source for editing and cause a frustum light source manipulator to appear.

In the example of FIG. 5A, virtual frustum light source 560 has been selected and placed at the location shown, and a frustum light source manipulator has been displayed over the virtual frustum light source. In some examples, the frustum light source manipulator can include shroud 532 (which in the context of virtual frustum light source 560 can provide a visual indication that no light is emanating from the sides or back of the virtual frustum light source), initial aperture boundary 552, axial fade boundary 534, and final aperture boundary 536. In the example of FIG. 5A, shroud 532 can appear as a ring around virtual frustum light source 560, with the ring lying in a plane orthogonal to axis 550. Initial aperture boundary 552 can indicate the initial aperture and the starting point of virtual frustum light source 560. Axial fade boundary 534 indicates the start of the fading of the light intensity emanating from virtual frustum light source 560 in the axial direction, and final aperture boundary 536 indicates the farthest reach or projection distance of the virtual frustum light source in the X, Y and axial directions. For example, the light intensity of virtual frustum light source 560 can remain constant from initial aperture boundary 552 outward to axial fade boundary 534, and thereafter the light intensity can drop off linearly or nonlinearly in the axial direction from the axial fade boundary outward to final aperture boundary 536 according to a selected fade equation until it reaches the final aperture boundary. In other examples, axial fade boundary 534 may not be present, and the light intensity can instead have a physically accurate falloff from initial aperture boundary 552 to final aperture boundary 536 according to the inverse square law, for example. At final aperture boundary 536, the light intensity can be zero, or in some instances nonzero. Beyond final aperture boundary 536 in the X, Y and axial directions there may be no light intensity produced by virtual frustum light source 546.

In some examples, the frustum light source manipulator can also include X-direction initial aperture affordance 562, Y-direction initial aperture affordance 564, axial fade affordance 538, X-direction final aperture affordance 566, Y-direction final aperture affordance 568, and axial projection and directional affordance 548. In other examples, affordance 548 can only be used for directional adjustments, and a separate axial projection affordance 549 can be provided for adjustments to the axial projection (extent or reach) of virtual frustum light source 546. In some examples, in addition to (or in some instances as an alternative to) axial projection and directional affordance 548, the frustum light source manipulator can also include directional affordance 556. The flat disc shape of X-direction initial aperture affordance 562, Y-direction initial aperture affordance 564, axial fade affordance 538, axial projection affordance 549, X-direction final aperture affordance 566, and Y-direction final aperture affordance 568 can intuitively suggest that these affordances can be manipulated in only a single direction, such as an X direction, a Y direction, or an axial direction. However, although X-direction initial aperture affordance 562, Y-direction initial aperture affordance 564, axial fade affordance 538, axial projection affordance 549, X-direction final aperture affordance 566, and Y-direction final aperture affordance 568 appear in the example of FIG. 5A as flat circular discs, in other examples the affordances can appear as other shapes. The spherical shape of axial projection and directional affordance 548 can intuitively suggest that this affordance can be moved in any direction (i.e., a multidirectional adjustment). However, although axial projection and directional affordance 548 appears as a sphere axially aligned with axis 550 of virtual frustum light source 560 but beyond the extent or reach of final aperture boundary 536, in other examples the axial projection and directional affordance can appear as other shapes.

In some examples, X-direction initial aperture affordance 562 and Y-direction initial aperture affordance 564 can be selected and repositioned (e.g., by touching or clicking, then dragging) in the X and Y directions, respectively, to adjust the aspect ratio of initial aperture boundary 552. As the aspect ratio of initial aperture boundary 552 is adjusted, in some examples the size of virtual frustum light source 560 and shroud 532 can be automatically adjusted in correspondence with the tapering frustum of the virtual frustum light source. In other examples, there may be no X-direction initial aperture affordance 562 or Y-direction initial aperture affordance 564 on initial aperture boundary 552, and the initial aperture boundary can be of a predetermined fixed size and aspect ratio. In these examples, initial aperture boundary 552 can be sized such that the tapered frustum of virtual frustum light source 560 originates at or about the center of the virtual frustum light source. Axial fade affordance 538 can be selected and repositioned (e.g., by touching or clicking, then dragging) in an axial direction with respect to axis 550 to adjust the location of axial fade boundary 534, with the limitation that the extent or reach of the axial fade boundary cannot exceed the projection distance of final aperture boundary 536. (Note that although the spot light source manipulator of FIGS. 4A and 4B does not include an axial fade boundary, in some examples the spot light source manipulator can include an axial fade boundary and an axial fade affordance similar to those shown in the frustum light source manipulator of FIGS. 5A and 5B.)

X-direction final aperture affordance 566 and Y-direction final aperture affordance 568 can be selected and repositioned (e.g., by touching or clicking, then dragging) in the X and Y directions, respectively, to adjust the aspect ratio of final aperture boundary 536. In some examples, axial projection and directional affordance 548 can be selected and repositioned (e.g., by touching or clicking, then dragging) in any direction in free space (i.e., a multidirectional adjustment) to adjust the axial projection distance and direction of virtual frustum light source 560. In other examples, affordance 548 can be selected and repositioned in any direction in free space to adjust only the direction of virtual frustum light source 560, and axial projection affordance 549 can be selected and repositioned axially to adjust only the axial projection distance (extent or reach) of the virtual frustum light source. Directional affordance 556 can have the appearance of a semitransparent sphere, and can be selected and repositioned (e.g., by touching or clicking, then dragging anywhere on the surface of the semitransparent sphere) to change the direction (but not the axial projection distance) of virtual frustum light source 560 (i.e., a multidirectional adjustment). The frustum light source manipulator and its affordances provide a visual indication of various characteristics of the virtual frustum light source and a visual means of manipulating those characteristics to enable efficient and accurate adjustments to the virtual frustum light source.

Figure 5B:
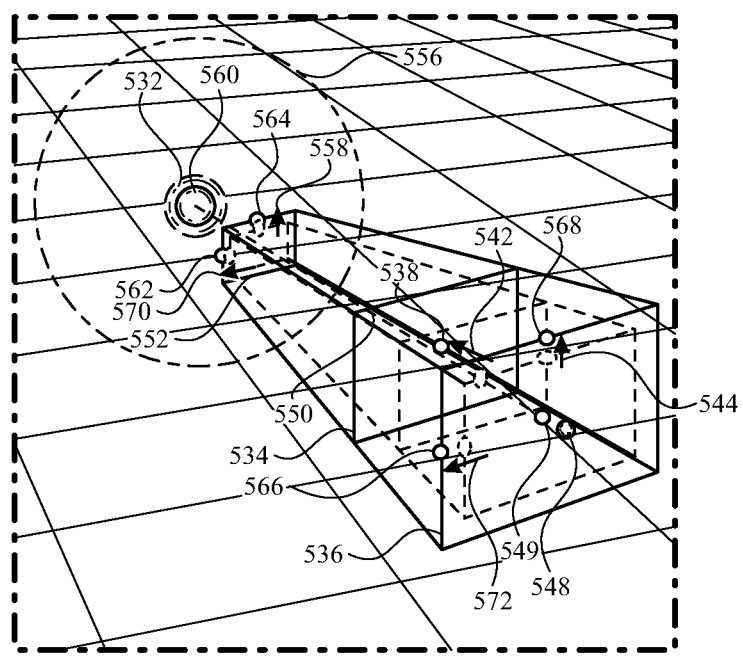
FIG. 5B illustrates the adjustment of an initial aperture boundary, an axial fade boundary, and a final aperture boundary of a frustum light source manipulator for a selected virtual frustum light source according to examples of the disclosure.

FIG. 5B illustrates the adjustment of initial aperture boundary 552, axial fade boundary 534 and final aperture boundary 536 of a frustum light source manipulator for selected virtual frustum light source 560 according to examples of the disclosure. In the example of FIG. 5B, X-direction initial aperture affordance 562 has been repositioned (from its previous location in dashed outline to its current location as a solid line disc) as indicated by arrow 570 to increase initial aperture boundary 552 in the X-direction. Y-direction initial aperture affordance 564 has also been repositioned (from its previous location in dashed outline to its current location as a solid line disc) as indicated by arrow 558 to increase initial aperture boundary 552 in the Y-direction. In the example of FIG. 5B, although the size of initial aperture boundary 552 has increased, the size of virtual frustum light source 560 and shroud 52 has remained the same. However, in other examples not shown in FIG. 5B, virtual frustum light source 560 and shroud 532 can change their size automatically depending on the size of initial aperture boundary 552. Axial fade affordance 538 has been repositioned (from its previous location in dashed outline to its current location as a solid line disc) as indicated by arrow 542 to increase the start of light intensity fading. X-direction final aperture affordance 566 has been repositioned (from its previous location in dashed outline to its current location as a solid line disc) as indicated by arrow 572 to increase final aperture boundary 536 in the X-direction. Y-direction final aperture affordance 568 has been repositioned (from its previous location in dashed outline to its current location as a solid line disc) as indicated by arrow 544 to increase final aperture boundary 536 in the Y-direction. Note that the directional changes of the affordances in FIG. 5B (i.e., to increase or decrease the size of the boundaries, or change the location of the boundaries) are just examples, and that any of the affordances may be repositioned in any direction. Note that because virtual frustum light source 560 emits light in the generally frustum-shaped pattern defined by the boundaries in FIGS. 5A and 5B, in some examples no light from the virtual frustum light source may be present in the 3D scene outside of those boundaries.

In some examples, the frustum light source manipulator can be maintained at a default size even when the 3D environment, virtual frustum light source 560, and any virtual objects in the environment are zoomed in or out. Maintaining the frustum light source manipulator at a default size can enable the frustum light source manipulator to maintain its ease of use, even when virtual frustum light source 560 and virtual objects are very small. However, in other examples, the frustum light source manipulator can grow or shrink as the 3D environment and virtual frustum light source 560 are zoomed out or in.

FIG. 6A illustrates an authoring environment GUI including virtual area light source 674 and an area light source manipulator according to some examples of the disclosure. Virtual area light source 674 can emit light in a generally rectangular-shaped, non-expanding pattern within the authoring environment. The authoring environment GUI can be displayed on an electronic device (e.g., similar to device 100 or 200) including, but not limited to, portable or non-portable computing devices such as a tablet computing device, laptop computing device or desktop computing device. FIG. 6A illustrates a 3D environment defined by X, Y and Z axes in a first mode of operation (e.g., a scene editing mode) and including virtual area light source 674 that has been imported or selected from a content library and added to the environment. In the example of FIG. 6A, virtual area light source 674 is displayed as a rectangle, but it should be understood that the rectangle is merely representative, and that the virtual area light source can be represented in other forms, such as a square, a triangle or other polygon, and the like.

The location of virtual area light source 674 in the 3D environment of FIG. 6A can be determined in a number of ways, such as by selecting and relocating the virtual area light source from an initial default location using a displayed cursor or other location indicator, using a finger or stylus touching or hovering over the virtual area light source without any visible indicator being displayed, or by configuring a virtual light source properties pane that may appear as an overlay in the 3D environment or may be displayed in a window outside the 3D environment. The color of virtual area light source 674 can also be set using the virtual light source properties pane. Selection of virtual area light source 674 by a finger/stylus touch or tap over the virtual area light source, or alternatively a mouse click or other selection action, can activate the virtual area light source for editing and cause a frustum light source manipulator to appear.

In the example of FIG. 6A, virtual area light source 674 has been selected and placed at the location shown, and an area light source manipulator has been displayed over the virtual area light source. In some examples, the area light source manipulator can include shroud 632 (which in the context of virtual area light source 674 can provide a visual indication that no light is emanating from the sides or back of the virtual area light source), initial aperture boundary 652, and final aperture boundary 636. In the example of FIG. 6A, shroud 632 can appear along the perimeter of virtual area light source 674. Initial aperture boundary 652 can indicate the initial aperture and the starting point of virtual area light source 674. Final aperture boundary 636 indicates the farthest reach or projection distance of the virtual area light source in the X, Y and axial directions. Although FIG. 6A does not show a fade boundary or affordance for virtual area light source 674, in other examples such a manipulator and affordance can be displayed and utilized. At final aperture boundary 636, in some examples the light intensity can be unchanged from the light intensity at initial aperture boundary 652, but if a fade boundary is present the light intensity at the final aperture boundary can be zero, or in some instances nonzero. Beyond final aperture boundary 636 in the X, Y and axial directions there may be no light intensity produced by virtual area light source 674.

The area light source manipulator can also include X-direction initial aperture affordance 662, Y-direction initial aperture affordance 664, axial final aperture affordance 676, and directional affordance 648. In some examples, in addition to (or in some instances as an alternative to) directional affordance 648, the area light source manipulator can also include directional affordance 656. The flat disc shape of X-direction initial aperture affordance 662, Y-direction initial aperture affordance 664, and axial final aperture affordance 676 can intuitively suggest that these affordances can be manipulated in only a single direction, such as an X direction, a Y direction, or an axial direction. However, although X-direction initial aperture affordance 662, Y-direction initial aperture affordance 664, and axial final aperture affordance 676 appear in the example of FIG. 6A as flat circular discs, in other examples the affordances can appear as other shapes. The spherical shape of directional affordance 648 can intuitively suggest that this affordance can be moved in any direction (i.e., a multidirectional adjustment). However, although directional affordance 648 appears as a sphere axially aligned with axis 650 of virtual area light source 674 but beyond the extent or reach of final aperture boundary 636, in other examples the directional affordance can appear as other shapes.

X-direction initial aperture affordance 662 and Y-direction initial aperture affordance 664 can be selected and repositioned (e.g., by touching or clicking, then dragging) in the X and Y directions, respectively, to adjust the aspect ratio of initial aperture boundary 652. Axial final aperture affordance 676 can be selected and repositioned (e.g., by touching or clicking, then dragging) along axis 650 to adjust the projection distance of final aperture boundary 636. Directional affordance 648 can be selected and repositioned (e.g., by touching or clicking, then dragging) in any direction in free space (i.e., a multidirectional adjustment) to adjust the direction of virtual area light source 674. Directional affordance 656 can have the appearance of a semitransparent sphere, and can be selected and repositioned (e.g., by touching or clicking, then dragging anywhere on the surface of the semitransparent sphere) to change the direction (but not the axial projection distance) of virtual area light source 674 (i.e., a multidirectional adjustment). The area light source manipulator and its affordances provide a visual indication of various characteristics of the virtual area light source and a visual means of manipulating those characteristics to enable efficient and accurate adjustments to the virtual area light source.

FIG. 6B illustrates the adjustment of initial aperture boundary 652 and final aperture boundary 636 of an area light source manipulator for selected virtual area light source 674 according to examples of the disclosure. In the example of FIG. 6B, X-direction initial aperture affordance 662 has been repositioned (from its previous location in dashed outline to its current location as a solid line disc) as indicated by arrow 670 to increase initial aperture boundary 652 in the X-direction. Y-direction initial aperture affordance 664 has also been repositioned (from its previous location in dashed outline to its current location as a solid line disc) as indicated by arrow 658 to increase initial aperture boundary 652 in the Y-direction. Note that because of this increase to initial aperture boundary 652, final aperture boundary 636 automatically increases by the same amount. In some examples not shown in FIG. 6B, shroud 632 can change its size depending on the size of initial aperture boundary 652. Axial final aperture affordance 676 has been repositioned (from its previous location in dashed outline to its current location as a solid line disc) as indicated by arrow 678 to increase the projection distance of the light intensity of virtual area light source 674. Note that the directional changes of the affordances in FIG. 6B (i.e., to increase or decrease the size of the boundaries, or change the location of the boundaries) are just examples, and that any of the affordances may be repositioned in any direction. Note that because virtual area light source 674 emits light in the generally rectangular-shaped, non-expanding pattern defined by the boundaries in FIGS. 6A and 6B, in some examples no light from the virtual area light source may be present in the 3D scene outside of those boundaries.

In some examples, the area light source manipulator can be maintained at a default size even when the 3D environment, virtual area light source 674, and any virtual objects in the environment are zoomed in or out. Maintaining the area light source manipulator at a default size can enable the area light source manipulator to maintain its ease of use, even when virtual area light source 674 and virtual objects are very small. However, in other examples, the area light source manipulator can grow or shrink as the 3D environment and virtual area light source 674 are zoomed out or in.

FIG. 7A illustrates an authoring environment GUI including virtual directional light source 780 and a directional light source manipulator according to some examples of the disclosure. Virtual directional light source 780 can emit light uniformly from a particular direction within the authoring environment. The authoring environment GUI can be displayed on an electronic device (e.g., similar to device 100 or 200) including, but not limited to, portable or non-portable computing devices such as a tablet computing device, laptop computing device or desktop computing device. FIG. 7A illustrates a 3D environment defined by X, Y and Z axes in a first mode of operation (e.g., a scene editing mode) and including virtual directional light source 780 that has been imported or selected from a content library and added to the environment. In the example of FIG. 7A, virtual directional light source 780 is displayed as a sphere with an attached bulbous directional extension 782, but it should be understood that the sphere and extension are merely representative, and that the virtual directional light source can be represented in other forms, such as a point, disc, and the like with a directional indicator or pointer having a different appearance as compared to FIG. 7A.

The location of virtual directional light source 780 in the 3D environment of FIG. 7A can be determined in a number of ways, such as by selecting and relocating the virtual directional light source from an initial default location using a displayed cursor or other location indicator, using a finger or stylus touching or hovering over the virtual directional light source without any visible indicator being displayed, or by configuring a virtual light source properties pane that may appear as an overlay in the 3D environment or may be displayed in a window outside the 3D environment. The color of virtual directional light source 780 can also be set using the virtual light source properties pane. Selection of virtual directional light source 780 by a finger/stylus touch or tap over the virtual directional light source, or alternatively a mouse click or other selection action, can activate the virtual directional light source for editing and cause a frustum light source manipulator to appear. In some examples, virtual directional light source 780 can be positioned in accordance with a number of degrees. For example, positioning virtual directional light source 780 at 10 degrees with respect to an object can set the virtual directional light source in a low position, such as near the horizon, to produce sunrise or sunset lighting, whereas positioning the virtual directional light source at 90 degrees can set the virtual directional light source directly over the object to produce midday lighting.

In the example of FIG. 7A, virtual directional light source 780 has been selected and placed at the location shown, and a directional light source manipulator has been displayed over the virtual directional light source. In some examples, the directional light source manipulator can include shroud 732 (which in the context of virtual directional light source 780 is not intended to represent that no light is emanating from the sides of the virtual directional light source) and directional extension 782. In the example of FIG. 7A, shroud 732 can be a semitransparent sphere having an opening 784 through which directional extension 782 passes through. Directional extension 782 and opening 784 can provide an indication of the direction of virtual directional light source 780.

The directional light source manipulator can also include directional affordance 748. In some examples, in addition to (or in some instances as an alternative to) directional affordance 748, the directional light source manipulator can also include directional affordance 756. The spherical shape of directional affordance 748 can intuitively suggest that this affordance can be moved in any direction (i.e., a multidirectional adjustment). However, although directional affordance 748 appears as a sphere axially aligned with axis 750 of virtual directional light source 780, in other examples the directional affordance can appear as other shapes. The directional light source manipulator and its affordances provide a visual indication of various characteristics of the virtual directional light source and a visual means of manipulating those characteristics to enable efficient and accurate adjustments to the virtual directional light source.

FIG. 7B illustrates the adjustment of a directional light source manipulator for selected virtual directional light source 780 according to examples of the disclosure. In the example of FIG. 7B, directional affordance 748 can be selected and repositioned (e.g., by touching or clicking, then dragging) in any direction in free space (i.e., a multidirectional adjustment) to adjust the direction of virtual directional light source 780. Directional affordance 756 can have the appearance of a semitransparent sphere, and can be selected and repositioned (e.g., by touching or clicking, then dragging anywhere on the surface of the semitransparent sphere) to change the direction of virtual directional light source 780 (i.e., a multidirectional adjustment).

In some examples, the directional light source manipulator can be maintained at a default size even when the 3D environment, virtual directional light source 780, and any virtual objects in the environment are zoomed in or out. Maintaining the directional light source manipulator at a default size can enable the directional light source manipulator to maintain its ease of use, even when virtual directional light source 780 and virtual objects are very small. However, in other examples, the directional light source manipulator can grow or shrink as the 3D environment and virtual directional light source 780 are zoomed out or in.

Figure 8:
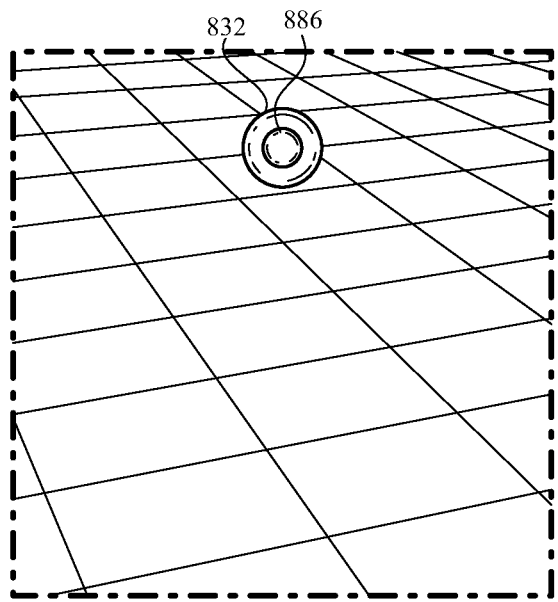
FIG. 8 illustrates an authoring environment GUI including a virtual ambient light source according to some examples of the disclosure.

FIG. 8 illustrates an authoring environment GUI including virtual ambient light source 886 according to some examples of the disclosure. Virtual ambient light source 886 can emit light uniformly from all directions within the authoring environment. The authoring environment GUI can be displayed on an electronic device (e.g., similar to device 100 or 200) including, but not limited to, portable or non-portable computing devices such as a tablet computing device, laptop computing device or desktop computing device. FIG. 8 illustrates a 3D environment defined by X, Y and Z axes in a first mode of operation (e.g., a scene editing mode) and including virtual ambient light source 886 that has been imported or selected from a content library and added to the environment. In the example of FIG. 8, virtual ambient light source 886 is displayed as a sphere, but it should be understood that the sphere is merely representative, and that the virtual ambient light source can be represented in other forms, such as a point, disc, and the like having a different appearance as compared to FIG. 8.

The location of virtual ambient light source 886 in the 3D environment of FIG. 8 can be determined in a number of ways, such as by selecting and relocating the virtual ambient light source from an initial default location using a displayed cursor or other location indicator, using a finger or stylus touching or hovering over the virtual ambient light source without any visible indicator being displayed, or by configuring a virtual light source properties pane that may appear as an overlay in the 3D environment or may be displayed in a window outside the 3D environment. The color of virtual ambient light source 886 can also be set using the virtual light source properties pane.

In the example of FIG. 8, virtual ambient light source 886 has been selected and placed at the location shown. However, in some examples no ambient light source manipulator may be associated with virtual ambient light source 886, and therefore no manipulator may be displayed over the virtual ambient light source. In some examples, virtual ambient light source 886 can include shroud 832 (which in the context of virtual ambient light source 886 is not intended to represent that no light is emanating from a particular location of the virtual ambient light source). In the example of FIG. 8, shroud 832 can be a semitransparent sphere positioned over virtual ambient light source 886.

Figure 9:
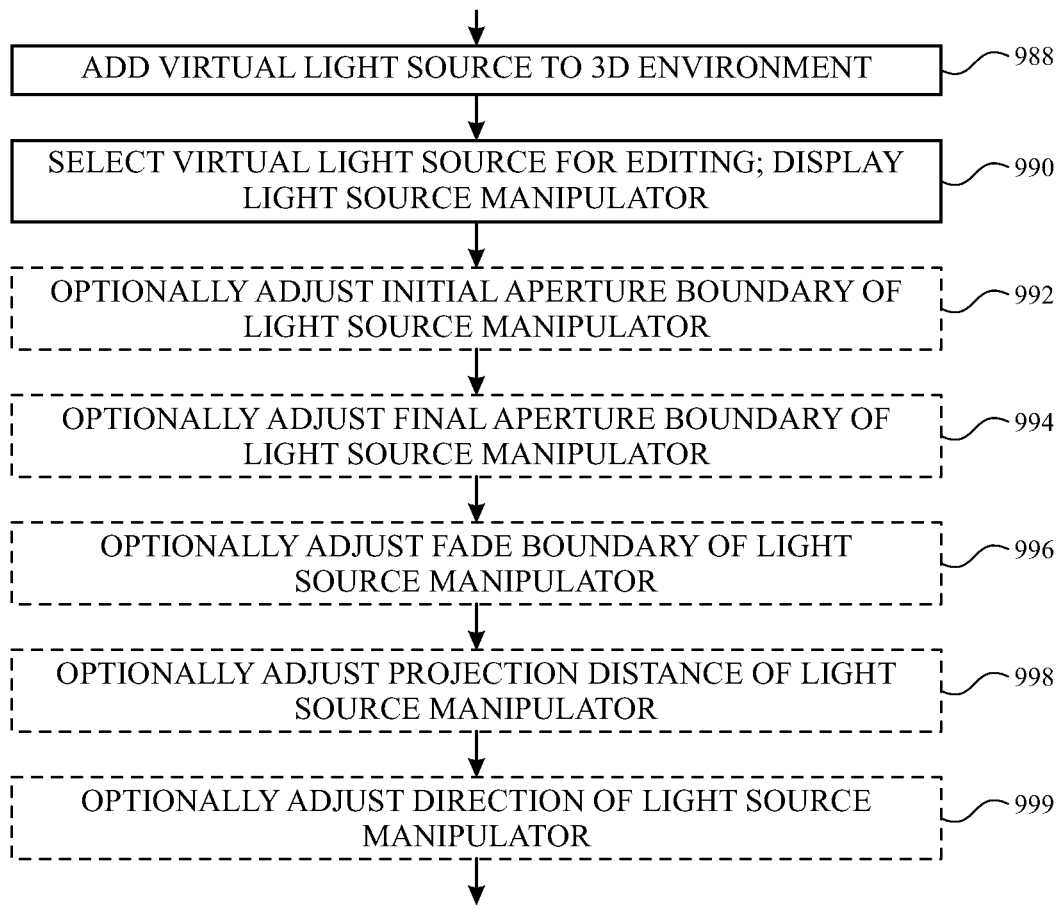
FIG. 9 illustrates a flow diagram illustrating a process for virtual light source manipulation according to examples of the disclosure.

FIG. 9 illustrates a flow diagram illustrating a process for virtual light source manipulation according to examples of the disclosure. In the example of FIG. 9, a virtual light source can first be added to the 3D environment at 988. A virtual light source in the environment can then be selected for editing at 990. Optionally (depending on the type of virtual light source and the type of light source manipulator), an initial aperture boundary of the light source manipulator can be adjusted at 992. Optionally (depending on the type of virtual light source and the type of light source manipulator), a final aperture boundary of the light source manipulator can be adjusted at 994. Optionally (depending on the type of virtual light source and the type of light source manipulator), a fade boundary of the light source manipulator can be adjusted at 996. Optionally (depending on the type of virtual light source and the type of light source manipulator), a projection distance (reach) of the light source manipulator can be adjusted at 998. Optionally (depending on the type of virtual light source and the type of light source manipulator), a direction of the light source manipulator can be adjusted at 999.

It is understood that the process of FIG. 9 is an example and that more, fewer, or different operations can be performed in the same or in a different order. Additionally, the operations in the process of FIG. 9 described above are, optionally, implemented by running one or more functional modules in an information processing apparatus such as general-purpose processors (e.g., as described with respect to FIG. 2) or application specific chips, and/or by other components of FIG. 2.

Therefore, according to the above, some examples of the disclosure are directed to a method comprising, at an electronic device in communication with a display and one or more input devices, presenting, using the display, a graphical environment including a virtual light source, while presenting the virtual light source, receiving input representing selection of the virtual light source, after receiving the input representing selection of the virtual light source, presenting a light source manipulator along with the presented virtual light source, the light source manipulator having one or more affordances including a spherical directional affordance for multidirectional adjustment of the virtual light source, while presenting the spherical directional affordance, receiving input representing a multidirectional adjustment of the spherical directional affordance, and after receiving the input representing the multidirectional adjustment of the spherical directional affordance, adjusting the selected virtual light source in accordance with the multidirectional adjustment. Additionally or alternatively to one or more of the examples presented above, in some examples the spherical directional affordance is located on an axis of the selected virtual light source. Additionally or alternatively to one or more of the examples presented above, in some examples the spherical directional affordance is a semitransparent sphere including a surface indicating possible multidirectional adjustments. Additionally or alternatively to one or more of the examples presented above, in some examples the semitransparent sphere is a partial sphere. Additionally or alternatively to one or more of the examples presented above, in some examples the light source manipulator further includes a first disc-shaped affordance for adjusting a boundary of the selected virtual light source in a first direction. Additionally or alternatively to one or more of the examples presented above, in some examples the first direction is an axial direction. Additionally or alternatively to one or more of the examples presented above, in some examples the first direction is orthogonal to an axis of the virtual light source. Additionally or alternatively to one or more of the examples presented above, in some examples the light source manipulator further includes a second disc-shaped affordance for adjusting the boundary of the selected virtual light source in a second direction orthogonal to the first direction. Additionally or alternatively to one or more of the examples presented above, in some examples the light source manipulator further includes a fade affordance for axial adjustment of a fade boundary of the virtual light source. Additionally or alternatively to one or more of the examples presented above, in some examples the light source manipulator further includes a final aperture affordance for adjusting a final aperture boundary of the virtual light source, the fade boundary and the final aperture boundary located in different planes. Additionally or alternatively to one or more of the examples presented above, in some examples the light source manipulator further includes an initial aperture affordance for adjusting an initial aperture boundary of the virtual light source, the initial aperture boundary and the virtual light source located in different planes. Additionally or alternatively to one or more of the examples presented above, in some examples the virtual light source is a virtual frustum light source and the light source manipulator is a frustum light source manipulator. Additionally or alternatively to one or more of the examples presented above, in some examples the virtual light source is a virtual area light source and the light source manipulator is an area light source manipulator. Additionally or alternatively to one or more of the examples presented above, in some examples the virtual light source is a virtual directional light source and the light source manipulator is a directional light source manipulator. Additionally or alternatively to one or more of the examples presented above, in some examples the method further comprises presenting a shroud at least partially surrounding the virtual light source, the shroud providing an indication of a directionality of light emanating from the virtual light source. Additionally or alternatively, in some examples a non-transitory computer readable storage medium stores instructions, which when executed by one or more processors, causes the one or more processors to perform a method according to one or more of the examples presented above. Additionally or alternatively, in some examples an electronic device comprises one or more processors, memory, and one or more programs, wherein the one or more programs are stored in the memory and configured to be executed by the one or more processors, the one or more programs including instructions for performing a method according to one or more of the examples presented above.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:

1. A method, comprising:
at an electronic device in communication with a display and one or more input devices:
presenting, using the display, a graphical environment including a virtual light source;
while presenting the virtual light source, receiving input representing selection of the virtual light source;
after receiving the input representing selection of the virtual light source, presenting a light source manipulator along with the presented virtual light source, the light source manipulator having one or more affordances including a spherical directional affordance for multidirectional adjustment of the virtual light source;
while presenting the spherical directional affordance, receiving input representing a multidirectional adjustment of the spherical directional affordance; and
after receiving the input representing the multidirectional adjustment of the spherical directional affordance, adjusting the selected virtual light source in accordance with the multidirectional adjustment.

2. The method of claim 1, wherein the spherical directional affordance is located on an axis of the selected virtual light source.

3. The method of claim 1, wherein the spherical directional affordance is a semitransparent sphere including a surface indicating possible multidirectional adjustments.

4. The method of claim 3, wherein the semitransparent sphere is a partial sphere.

5. The method of claim 1, the light source manipulator further including a first disc-shaped affordance for adjusting a boundary of the selected virtual light source in a first direction.

6. The method of claim 5, wherein the first direction is an axial direction.

7. The method of claim 5, wherein the first direction is orthogonal to an axis of the virtual light source.

8. The method of claim 5, the light source manipulator further including a second disc-shaped affordance for adjusting the boundary of the selected virtual light source in a second direction orthogonal to the first direction.

9. An electronic device comprising:
one or more processors;
memory; and
one or more programs, wherein the one or more programs are stored in the memory and configured to be executed by the one or more processors, the one or more programs including instructions for:
presenting, using a display, a graphical environment including a virtual light source;
while presenting the virtual light source, receiving input representing selection of the virtual light source;
after receiving the input representing selection of the virtual light source, presenting a light source manipulator along with the presented virtual light source, the light source manipulator having one or more affordances including a spherical directional affordance for multidirectional adjustment of the virtual light source;
while presenting the spherical directional affordance, receiving input representing a multidirectional adjustment of the spherical directional affordance; and
after receiving the input representing the multidirectional adjustment of the spherical directional affordance, adjusting the selected virtual light source in accordance with the multidirectional adjustment.

10. The electronic device of claim 9, the light source manipulator further including a fade affordance for axial adjustment of a fade boundary of the virtual light source.

11. The electronic device of claim 10, the light source manipulator further including a final aperture affordance for adjusting a final aperture boundary of the virtual light source, the fade boundary and the final aperture boundary located in different planes.

12. The electronic device of claim 9, the light source manipulator further including an initial aperture affordance for adjusting an initial aperture boundary of the virtual light source, the initial aperture boundary and the virtual light source located in different planes.

13. The electronic device of claim 9, wherein the virtual light source is a virtual frustum light source and the light source manipulator is a frustum light source manipulator.

14. The electronic device of claim 9, wherein the virtual light source is a virtual area light source and the light source manipulator is an area light source manipulator.

15. The electronic device of claim 9, wherein the virtual light source is a virtual directional light source and the light source manipulator is a directional light source manipulator.

16. The electronic device of claim 9, the one or more programs including further instructions for presenting a shroud at least partially surrounding the virtual light source, the shroud providing an indication of a directionality of light emanating from the virtual light source.

17. A non-transitory computer readable storage medium storing instructions, which when executed by one or more processors, cause the one or more processors to:
at an electronic device in communication with a display and one or more input devices:
present, using the display, a graphical environment including a virtual light source;
while presenting the virtual light source, receive input representing selection of the virtual light source;
after receiving the input representing selection of the virtual light source, present a light source manipulator along with the presented virtual light source, the light source manipulator having one or more affordances including a spherical directional affordance for multidirectional adjustment of the virtual light source;
while presenting the spherical directional affordance, receive input representing a multidirectional adjustment of the spherical directional affordance; and
after receiving the input representing the multidirectional adjustment of the spherical directional affordance, adjust the selected virtual light source in accordance with the multidirectional adjustment.

18. The non-transitory computer readable storage medium of claim 17, wherein the spherical directional affordance is located on an axis of the selected virtual light source.

19. The non-transitory computer readable storage medium of claim 17, wherein the spherical directional affordance is a semitransparent sphere including a surface indicating possible multidirectional adjustments.

20. The non-transitory computer readable storage medium of claim 17, the light source manipulator further including a first disc-shaped affordance for adjusting a boundary of the selected virtual light source in a first direction.

\* \* \* \* \*